United States Patent [19]

Astle

[11] Patent Number: 5,684,544

[45] Date of Patent: Nov. 4, 1997

[54] APPARATUS AND METHOD FOR UPSAMPLING CHROMA PIXELS

[75] Inventor: Brian Astle, Plainsboro, N.J.

[73] Assignee: Intel Corporation, Santa Clara, Calif.

[21] Appl. No.: 439,799

[22] Filed: May 12, 1995

[51] Int. Cl.[6] .................................................. H04N 9/64
[52] U.S. Cl. .......................... 348/708; 348/427; 348/392
[58] Field of Search .................................. 348/708, 703, 348/649, 651, 645, 646, 392, 427, 441; H04N 9/64, 11/62

[56] References Cited

U.S. PATENT DOCUMENTS 5,253,041  10/1993  Wine .
5,253,043  10/1993  Gibson .
5,280,343  1/1994   Sullivan .

*Primary Examiner*—Sherrie Hsia
*Attorney, Agent, or Firm*—William H. Murray; N. Stephan Kinsella

[57] ABSTRACT

A computer-implemented method and apparatus for upsampling subsampled chroma pixels of a picture. According to a preferred embodiment, there is provided a plurality of subsampled chroma pixels as well as a plurality of luma pixels. The subsampled chroma pixels are upsampled as a function of luma pixels of the plurality of luma pixels to provide at least one upsampled chroma pixel.

23 Claims, 4 Drawing Sheets

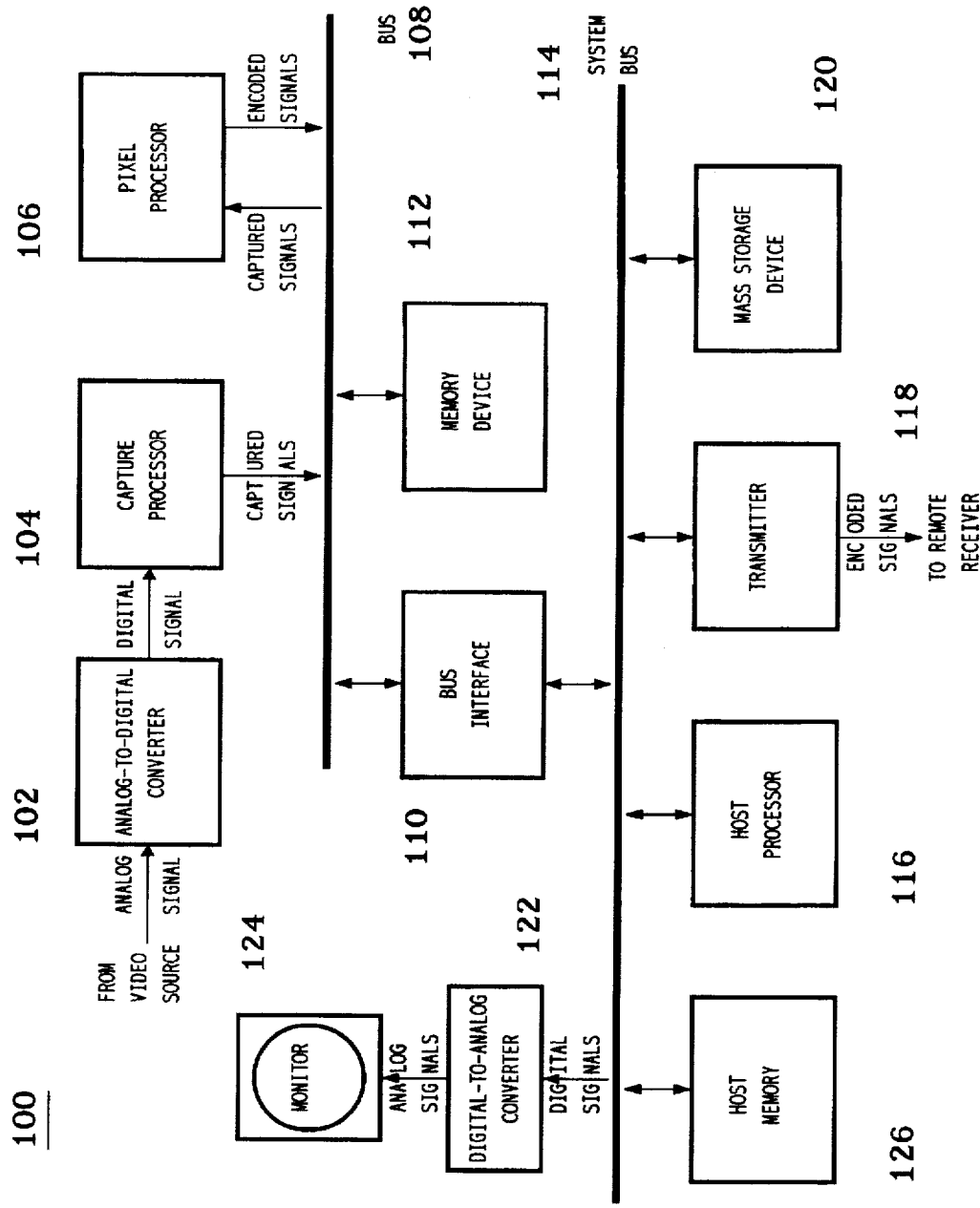
FIGURE 1. ENCODING SYSTEM

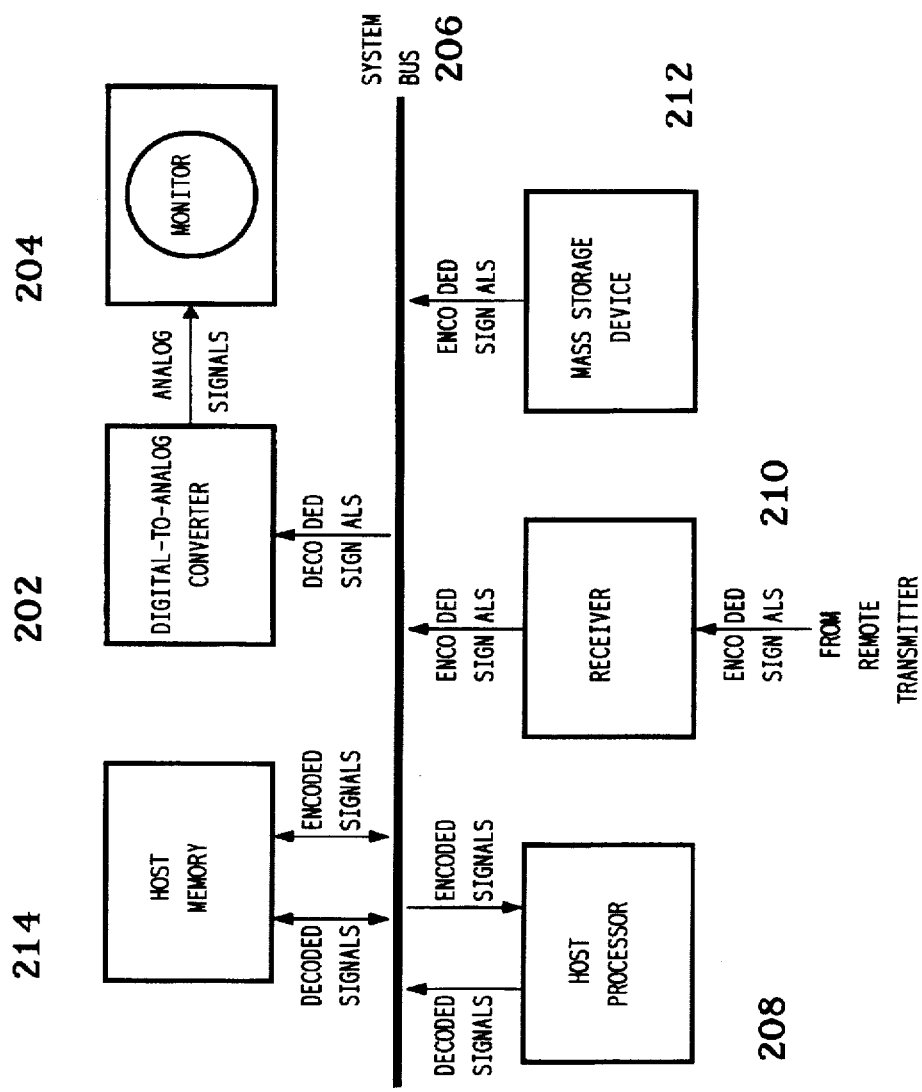
FIGURE 2. DECODING SYSTEM

FIGURE 3 CO-LOCATED YUV4:1:1 DATA

300

400

APPARATUS AND METHOD FOR UPSAMPLING CHROMA PIXELS

BACKGROUND OF THE INVENTION

1. Field of the Invention

The present invention relates to signal processing and, in particular, to computer-implemented processes and apparatuses for upsampling chroma signals in subsampled pictures.

2. Description of the Related Art

This invention relates to signal processing which is often used to compress or encode video image signals representative of video pictures into an encoded bitstream and to decompress or decode such encoded bitstream to reconstruct the original video image signals. Each picture may be a still image, or may be part of a plurality of successive pictures of video signal data that represent a motion video. As used herein, "picture" and "video picture" may interchangeably refer to signals representative of an image as hereinabove described.

The portion of an encoded bitstream representing a compressed picture may be stored in a mass storage device such as a hard disk drive or compact disk read-only-memory (CD-ROM) in its compressed format in order to conserve storage space. When the compressed picture is later retrieved it may be decompressed and, for example, displayed on a monitor. A higher amount of compression of the blocks constituting an image tends to lower the number of bits needed to represent the image, but also tends to diminish the quality of the image reconstructed by the decoder.

The encoded bitstream may also be transmitted to one or more remote signal processing systems such as video conferencing nodes which decode the encoded signals. These video conferencing nodes may be personal computer (PC)-based systems communicating with each other over a selected transmission medium. Possible transmission media include Integrated Services Digital Network (ISDN) and Public Switched Telephone Network (PSTN) telephone connections. Although ISDN connections provide a higher bandwidth than PSTN connections, ISDN connections are currently less readily available and more expensive than PSTN connections.

Because transmission media have finite bandwidths, in order to provide video conferencing of satisfactory quality each PC system preferably compresses or encodes in real time the video signals corresponding to the local participant and transmits the resulting compressed signals or bitstreams to the PC systems of the remote participants. In such a video conferencing system, each PC system also preferably receives and decompresses compressed signals from the PC systems of the remote participants to play the decompressed video signals locally. The encoder may also, in some usages, encode video pictures offline to perform more computation intensive and more efficient encoding.

Color video pictures are usually represented by three independent vectors in one of various formats, e.g. Red-Green-Blue (RGB) or YUV formats. In the YUV format, Y represents luminance, associated with luminance signals or pixels, also referred to as luma pixels; while U and V represent chrominance, associated with chrominance signals, also referred to as chroma pixels. Chroma pixels are typically subsampled by representing multiple chroma pixels with a single chroma pixel (for example, an arbitrary, representative, or average chroma pixel) so that the multiple chroma pixels can be encoded and transmitted with a smaller codesize. Common spatial subsampling methods include 4:1 chroma subsampling in both horizontal and vertical directions, 2:1 chroma subsampling horizontally, and 2:1 subsampling in both directions.

Encoding operations that compress video image signals thus typically operate macroblocks comprising a number of blocks, where each block is a subset of the image, such as an (8×8) block of pixels. A macroblock typically comprises a (16×16) array of luma pixels and two associated (8×8) blocks of subsampled chroma pixels. The (16×16) luma array is further divided into four (8×8) blocks, and all six blocks in a macroblock are typically transformed using the forward discrete cosine transform (DCT), quantized, and further encoded.

When the encoded image is decoded, the chroma pixels must be upscaled to match the luma pixels. Chroma signal upsampling is usually done by linear or higher order interpolation between the subsampled chroma pixels that are available to the decoder after being decoded from the encoded bitstream. This method of interpolation used in chroma signal upscaling will be referred to herein as isolated interpolation. One problem with prior art chroma upsampling techniques such as isolated chroma interpolation is that it leads to inaccurate color rendition, particularly near edges where the hue and saturation change abruptly. For example, a red object overlying a black object will, after encoding with subsampling and decoding with upsampling, show visible diffusion of red into the black.

There is thus a need for improved computer-implemented processes and apparatuses for upsampling chrominance signals.

SUMMARY

There is provided herein a computer-implemented method and apparatus for upsampling subsampled chroma pixels of a picture. According to a preferred embodiment of the invention, there is provided a plurality of subsampled chroma pixels as well as a plurality of luma pixels. The subsampled chroma pixels are upsampled as a function of luma pixels of the plurality of luma pixels to provide at least one upsampled chroma pixel.

BRIEF DESCRIPTION OF THE DRAWINGS

These and other features, aspects, and advantages of the present invention will become more fully apparent from the J following description, appended claims, and accompanying drawings in which:

FIG. 1 is a computer-based encoding system for encoding video signals, according to a preferred embodiment of the present invention;

FIG. 2 is a computer-based decoding system for decoding the video signals encoded by the encoding system of FIG. 1, according to a preferred embodiment of the present invention;

FIG. 3 is a representation of YUV data for an (8×8) bitmap in co-located YUV4:1:1 format before upsampling by the decoding system of FIG. 2;

DESCRIPTION OF THE PREFERRED EMBODIMENT

Figure 4:
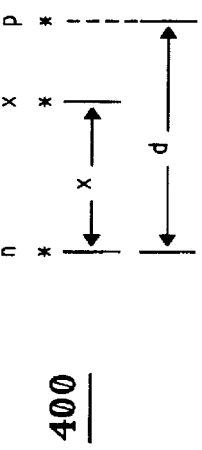
FIG. 4 is a pixel interpolation diagram.

In the present invention, there is disclosed a computer-implemented method and apparatus for upscaling chroma pixels by using luma pixel information to improve the accuracy of the upscaling process. Methods and apparatuses for performing these functions are described in further detail hereinbelow.

Video Processing System Hardware

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each picture of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals, as described in further detail below, to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled pictures. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386, 486, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC) -based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals, including the upsampling described hereinbelow.

System bus 206 may be any suitable digital signal transfer device and is preferably an industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded video image signals in real-time during the capture and encoding of video signals to monitor the encoding processing. In a preferred embodiment, encoding system 100 encodes video image signals in real time to yield an encoded bitstream, and transmits the encoded bitstream to decoding system 200. Decoding system 200 decodes and upsamples the encoded bitstream as described in further detail below.

Upsampling of Chrominance Signals

Referring now to FIG. 3, there is shown a representation of YUV data for an (8×8) bitmap 300 in co-located YUV4:1:1 format before upsampling by decoding system 200 of FIG. 2. In co-located YUV4:1:1 data, the locations of the U and V chroma pixels correspond to the locations of the Y components in the top left corner of each (4×4) subblock of Y data. Thus, in subsampled bitmap 300, the U and V chroma pixels are subsampled at a 4:1 ratio in both horizontal and vertical directions. It will be understood that other subsampling methods may be utilized, for example centered YUV4:1:1 data, in which the locations of the U and V chroma pixels correspond to the center of the components of each (4×4) subblock of Y data. I will further be understood that other YUV formats may be utilized in which the chroma pixels are subsampled at ratios other than 4:1.

After decoding the encoded bitstream to provide a decoded, subsampled bitmap such as bitmap 300, decoding system 200 upsamples the U and V chroma pixels to "fill in" component values for all pixels. In prior art techniques, interpolation is used for such upsampling. For example, in the prior art, for row 0 of bitmap 300, the U components for columns 1, 2, and 3 are generated by interpolating between the U components for columns 0 and 4. In another prior art technique, replication is utilized instead of interpolation. In replication, the U components for columns 1, 2, and 3 are generated by replicating the U component in column 0. Additionally, interpolation of a higher order than linear interpolation may also be utilized in prior art techniques. As explained hereinabove, however, such prior art isolated interpolation techniques lead to inaccurate color rendition, particularly near edges where the hue and saturation change abruptly. For example, a red object overlying a black object will show visible diffusion of red into the black.

As explained above, one reason for such problems with isolated interpolation is that the interpolation does not utilize all the available information, to-wit the luma pixels which are available at a higher spatial resolution. It has been discovered by the inventor that an improved upsampling of chroma pixels results by taking into account not only the subsampled chroma pixels, but also the luma pixels. Although perfect chroma reconstruction is not possible, a greatly improved visual effect can be obtained by using the luma pixels when upsampling chroma pixels. Color errors are reduced particularly at the edges of objects. Thus, in the present invention, the luma pixels are utilized in interpolating to fill in missing U and V chroma pixels. In contrast to the above-described prior art isolated interpolation techniques, the present invention upsamples chroma information through what may be referred to as combined interpolation, since information from both the subsampled chroma components as well as from the luma components is utilized in upsampling chroma pixels.

As will be understood, chroma variations can arise from several causes, including:

1. Changes in illumination on a uniformly colored object;
2. Smooth changes in color; and
3. Abrupt changes in color.

Isolated interpolation of chroma pixels works well for case 2, is less than optimum in case 1, and performs poorly in case 3. When the combined interpolation of the present invention is utilized, excellent results are obtained for case 1, a slightly improved interpolation is obtained for case 2, and a greatly improved interpolation is obtained for case 3.

In a preferred embodiment, the luma pixels are subsampled to the same resolution as the chroma pixels, to provide a set of subsampled luma pixels. A texture coefficient may then be defined which relates the subsampled luma pixels to the subsampled chroma pixels at sample points n by the formula:

$$A_n = U_n/Y_n$$

$$B_n = V_n/Y_n$$

where $A_n$ and $B_n$ are the texture coefficients for U and V chroma pixels at point n, respectively, $U_n$ and $V_n$ are the actual chroma pixel values at point n, and $Y_n$ is the subsampled luma pixel value at the same point n.

As will be understood by those skilled in the art, texture coefficients may be defined, in alternate preferred embodiments, with other color formats, for example hue, saturation, value. As is understood, in this format the "value" component corresponds to luminance, while the hue and saturation components may be considered to be components that determine chrominance, or chroma components. As will be appreciated, the texture coefficients are in general selected to represent relationships between the luma or value component and the other chroma components which are encoded at a higher resolution than the luma component. Ideally, a texture coefficient is chosen so that it remains fairly constant as the illumination on an object of a fixed color changes. In the hue-saturation-value format, texture coefficient A could have the form A=hue/value, B having the form B=saturation/luminance.

After defining such texture coefficients, vertical interpolation may be performed. As will be understood, such interpolation may be linear, cubic, or higher order. For illustrative purposes linear interpolation will be assumed in the example below. Referring now to FIG. 4, there is shown a pixel interpolation diagram 400. Points n and p are two points at which there exist subsampled chroma and luma pixels, separated by a distance d. Thus, at points n and p, there will be defined texture coefficients $A_n$, $B_n$, $A_p$, and $B_p$. When luma pixels $U_x$ and $V_x$ need to be upsampled for a distance x away from point n and along the line towards point p, texture coefficients $A_x$ and $B_x$ which are used in these equations may be interpolated between previously-calculated values of $A_n$, $B_n$, $A_p$, and $B_p$, as follows:

$$A_x = A_n + x(A_p - A_n)/d$$

$$B_x = B_n + x(B_p - B_n)/d$$

As will be understood, various interpolation methods may be utilized to calculate such interpolated texture coefficients $A_x$ and $B_x$. Given texture coefficients $A_x$ and $B_x$ and the luma pixel $Y_x$ corresponding to point x, upsampled chroma pixels $U_x$ and $V_x$ may be determined as follows:

$$U_x = A_x Y_x$$

$$V_x = B_x Y_x$$

After performing the above-described interpolation in the vertical direction, a similar technique may be utilized to perform horizontal interpolation. As will be appreciated, carrying out vertical interpolation before horizontal interpolation is usually more efficient since most image architectures can access horizontal rows of pixels more easily than vertical rows.

An example will now be presented to illustrate the operation of the above-described embodiment of the present invention. In the following example, a red object (represented by luma pixels of value 56 and chroma pixels of value 64) overlaps a dark gray object (represented by luma pixels of value 8 and chroma pixels of value 0). For simplicity only one chroma component is illustrated. Illustrated below is one horizontal scan line across 13 pixel columns of a picture before encoding, where the left 7 pixels represent the dark gray object and the right 6 pixels represent a red object:

| Luma pixels: | 8 | 8 | 8 | 8 | 8 | 8 | 8 | 56 | 56 | 56 | 56 | 56 | 56 |
|---|---|---|---|---|---|---|---|---|---|---|---|---|---|
| Chroma pixels: | 0 | 0 | 0 | 0 | 0 | 0 | 0 | 64 | 64 | 64 | 64 | 64 | 64 |
|  |  |  | (......dark gray......) | | | | | (........red........) | | | | | |

Subsampling the chroma pixels 2:1 using a 1 2 1 low pass filter provides:

| Luma pixels: | 8 | 8 | 8 | 8 | 8 | 8 | 8 | 56 | 56 | 56 | 56 | 56 | 56 |
|---|---|---|---|---|---|---|---|---|---|---|---|---|---|
| Chroma pixels: | 0 |  | 0 |  | 0 |  | 16 |  | 64 |  | 64 |  | 64 |

As will be understood, a 1 2 1 low pass filter operates by multiplying a pixel by 2, and adding this to its neighboring pixels multiplied by the other weights (1 and 1), and dividing by the sum of the weights (1+2+1=4). Thus, the last 0 chroma pixel has neighbors of 0 and 64, providing a subsampled value of: (1*0+2*0+1*64)/4=16.

Repeating this process to provide 4:1 subsampling produces:

| Luma pixels: | 8 | 8 | 8 | 8 | 8 | 8 | 8 | 56 | 56 | 56 | 56 | 56 | 56 |
|---|---|---|---|---|---|---|---|---|---|---|---|---|---|
| Chroma sub: | 0 |  |  |  | 4 |  |  |  | 52 |  |  |  | 64 |

Isolated linear upsampling in accordance with prior art techniques would yield:

| Luma pixels: | 8 | 8 | 8 | 8 | 8 | 8 | 8 | 56 | 56 | 56 | 56 | 56 | 56 |
|---|---|---|---|---|---|---|---|---|---|---|---|---|---|
| Chroma pixels: | 0 | 1 | 2 | 3 | 4 | 16 | 28 | 40 | 52 | 55 | 58 | 61 | 64 |

Comparing this upsampled result with the original, pre-subsampled pixels, shows that the red chroma information has penetrated several pixels into the dark gray region. In addition, the chroma transition after upsampling has a magnitude of only 12 (i.e., 40–28) compared to the original transition of 64 (64–0).

When upsampling in accordance with the present invention, the luma pixels are first subsampled by two subsampling steps to give the values shown below:

| Luma pixels: | 8 | 8 | 8 | 8 | 8 | 8 | 8 | 56 | 56 | 56 | 56 | 56 | 56 |
|---|---|---|---|---|---|---|---|---|---|---|---|---|---|
| Luma sub: | 8 |  |  |  | 11 |  |  |  | 47 |  |  |  | 56 |
| Chroma sub: | 0 |  |  |  | 4 |  |  |  | 52 |  |  |  | 64 | where the chroma subsampled pixels are the same values as shown above after 4:1 subsampling. Carrying out the upsampling method of the present invention provides:

| Luma pixels: | 8 | 8 | 8 | 8 | 8 | 8 | 8 | 56 | 56 | 56 | 56 | 56 | 56 |
|---|---|---|---|---|---|---|---|---|---|---|---|---|---|
| Luma sub: | 8 |  |  |  | 11 |  |  |  | 47 |  |  |  | 56 |
| Chroma sub: | 0 |  |  |  | 4 |  |  |  | 52 |  |  |  | 64 |
| A: | 0 |  |  |  | 4/11 |  |  |  | 52/47 |  |  |  | 64/56 |
| Chroma upsamp: | 0 | 1 | 1 | 2 | 3 | 4 | 6 | 52 | 62 | 62 | 63 | 64 | 64 |

Compared to the prior art isolated technique illustrated above, the combined interpolation technique of the present invention causes the chroma information to penetrate the same distance into the dark gray region, but with a greatly reduced amplitude. As can be seen, the sum of the chroma pixels in the dark gray region is only 17, which is much closer to the original sum of 0 than is the sum of 54 of the isolated upsampling technique. Similarly, the chroma transition is 46 (52–6), which is higher than the isolated interpolation transition of 12, and is thus much closer to the original transition of 64.

Figure 5:
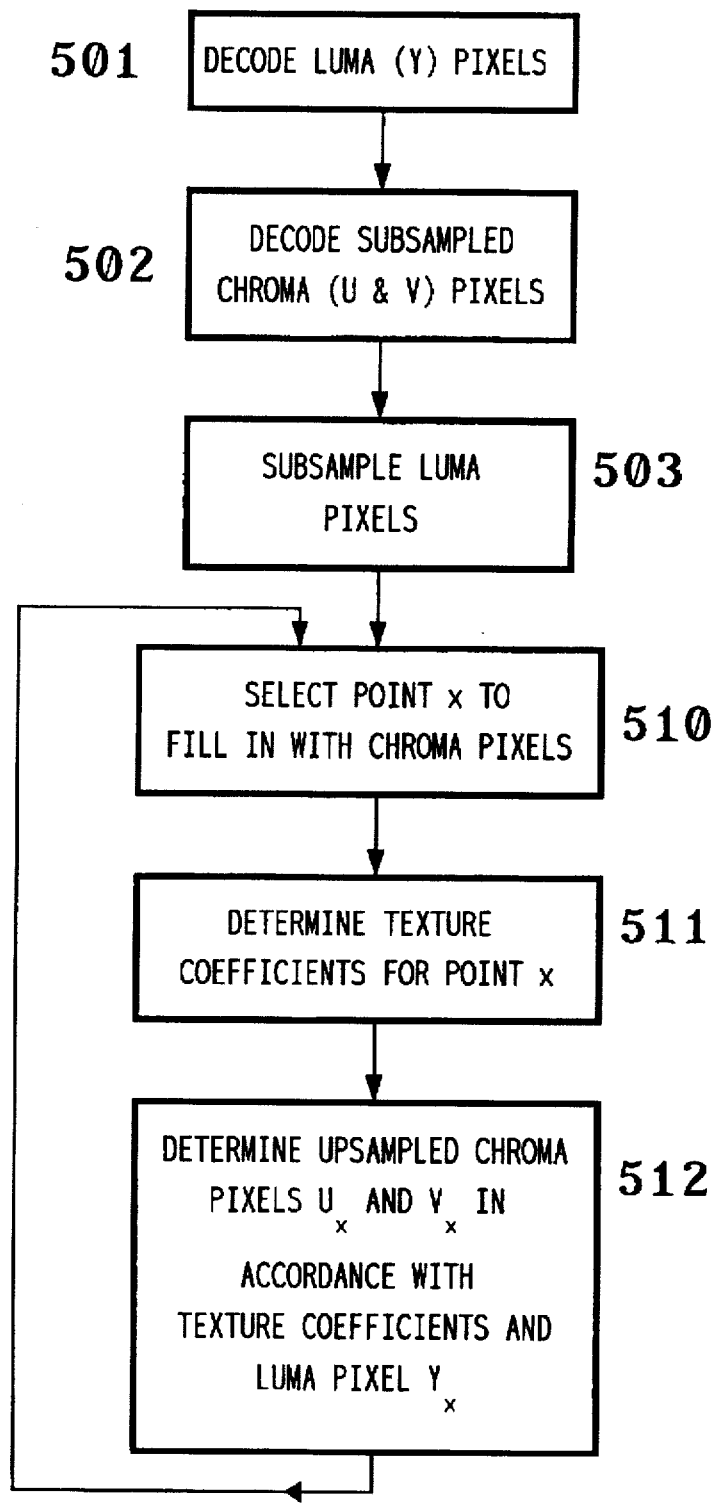
FIG. 5 is a flow chart of the method of operation of the decoding system of FIG. 2 in accordance with the present invention.

The preferred embodiment will now be described in broad terms with reference to FIG. 5, in which there is shown a flow chart 500 of the method of operation of the decoding system 200 of FIG. 2 in accordance with the present invention. First, decoding system 200 decodes the encoded bitstream received from encoding system 100, to produce the decoded luma (Y) pixels and the subsampled chroma (U and V) pixels (steps 501 and 502). As described in further detail above, the luma pixels are then subsampled to the same resolution as the chroma pixels, to provide a set of subsampled luma pixels (step 503). A point x between two (or more) subsample points is selected at which no actual chroma pixel was encoded and transmitted (step 510). This point x is selected as the point at which to provide an upsampled U chroma pixel and an upsampled V chroma pixel. Thereafter, the texture coefficients $A_x$ and $B_x$ are determined for point x, as described in further detail hereinabove (step 511). Once these texture coefficients are calculated, decoding system 200 then determines the upsampled pixels $U_x$ and $V_x$ in accordance with these texture coefficients and in accordance with the the luma pixel $Y_x$ corresponding to point x (step 512). Steps 510–512 are then repeated as necessary to fill in further chroma pixel values.

It will be appreciated that, in the method of the present invention, the chroma may be very sensitive to variations of the luma near black luma values. If the luma level is close to zero, then neighboring pixels with higher luma values may have interpolated chroma values which are too high. This effect may magnify chroma noise in dark areas of an image. One solution to this problem is to constrain the increase in the interpolated chroma value if the luma value exceeds the local subsampled luma value.

Although linear interpolation techniques have been described herein, those skilled in the art will understand that, in alternative preferred embodiments, alternative interpolation techniques other than linear interpolation may be utilized. For example, the method of the present invention may be extended to higher order interpolation such as cubic. The method of the present invention may also be extended to two-dimensional non-separable interpolation methods.

As will further be understood, in alternative preferred embodiments the chroma pixels and luma pixels may not be physically coincident with one another- For example, if chroma subsampling is done with even filters, the subsampled chroma pixels will lie between the luma pixels. In this case the luma pixels may be subsampled with a similar filter to obtain coincident pixels in order to obtain the texture coefficients used in the combined interpolation of the present invention. Similarly, if the chroma pixels are subsampled with centered subsampling rather than co-located subsampling method, then a similar subsampling method may be applied to the luma pixels to obtain centered, subsampled luma pixels to determine the texture coefficients.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for upsampling subsampled chroma pixels of a picture, comprising the steps of:
   (a) providing a plurality of subsampled chroma pixels;
   (b) providing a plurality of luma pixels; and
   (c) upsampling the subsampled chroma pixels as a function of luma pixels of the plurality of luma pixels to provide at least one upsampled chroma pixel.

2. The method of claim 1, wherein the luma pixels of the plurality of luma pixels are spatially related to the subsampled chroma pixels of the plurality of subsampled chroma pixels.

3. The method of claim 1, wherein:
   the plurality of luma pixels comprises a plurality of Y luma pixels; and
   the plurality of subsampled chroma pixels comprises a plurality of U subsampled chroma pixels and a plurality of V subsampled chroma pixels.

4. The method of claim 1, wherein steps (a) and (b) comprise the step of decoding an encoded bitstream to provide the plurality of subsampled chroma pixels and the plurality of luma pixels.

5. The method of claim 1, wherein:
   the plurality of subsampled chroma pixels are subsampled at a resolution; and the step (c) comprises the steps of:
   (1) subsampling the plurality of luma pixels at the same resolution as the plurality of subsampled chroma pixels to provide a plurality of subsampled luma pixels;
   (2) determining a point x at which to provide upsampled chroma pixels $U_x$ and $V_x$;
   (3) determining adjacent texture coefficients for subsample points adjacent to the point x;
   (4) determining interpolated texture coefficients $A_x$ and $B_x$ for the point x in accordance with the adjacent texture coefficients and with a luma pixel $Y_x$ for the point x; and
   (5) determining $U_x$ as a function of $A_x$ and $Y_x$ and determining $V_x$ as a function of $B_x$ and $Y_x$.

6. The method of claim 5, wherein:
   the step (c)(3) comprises the steps of determining an adjacent texture coefficient $A_n$ for a point n adjacent to the point x in accordance with the formula $A_n=U_n/Y_n$, determining an adjacent texture coefficient $B_n$ for the point n in accordance with the formula $B_n=V_n/Y_n$, wherein n is a subsample point adjacent to x, determining an adjacent texture coefficient $A_p$ for a point p adjacent to the point x in accordance with the formula $A_p=U_p/Y_p$, and determining an adjacent texture coefficient $B_p$ for the point p in accordance with the formula $B_p=V_p/Y_p$, wherein p is a second subsample point adjacent to x;
   the step (c)(4) comprises the steps of determining $A_x$ in accordance with the formula $A_x=A_n+x(A_p-A_n)/d$ and determining $B_x$ in accordance with the formula $B_x=B_n+x(B_p-B_n)/d$, wherein d is the distance between the points n and p and x is the distance from the point n along a line from the point n to the point p; and
   the step (c)(5) comprises the steps of determining $U_x$ in accordance with the formula $U_x=A_xY_x$ and determining $V_x$ in accordance with the formula $V_x=B_xY_x$.

7. The method of claim 1, wherein the plurality of luma pixels are provided at a higher resolution than the plurality of subsampled chroma pixels.

8. An apparatus for upsampling subsampled chroma pixels of a picture, comprising:
   (a) means for providing a plurality of subsampled chroma pixels;
   (b) means for providing a plurality of luma pixels; and
   c) means for upsampling the subsampled chroma pixels as a function of luma pixels of the plurality of luma pixels to provide at least one upsampled chroma pixel.

9. The apparatus of claim 8, wherein the luma pixels of the plurality of luma pixels are spatially related to the subsampled chroma pixels of the plurality of subsampled chroma pixels.

10. The apparatus of claim 8, wherein:

the plurality of luma pixels comprises a plurality of Y luma pixels; and the plurality of subsampled chroma pixels comprises a plurality of U subsampled chroma pixels and a plurality of V subsampled chroma pixels.

11. The apparatus of claim 8, wherein means (a) and (b) comprise means for decoding an encoded bitstream to provide the plurality of subsampled chroma pixels and the plurality of luma pixels.

12. The apparatus of claim 8, wherein:

the plurality of subsampled chroma pixels are subsampled at a resolution; and the means (c) comprises:

(1) means for subsampling the plurality of luma pixels at the same resolution as the plurality of subsampled chroma pixels to provide a plurality of subsampled luma pixels;

(2) means for determining a point x at which to provide upsampled chroma pixels $U_x$ and $V_x$;

(3) means for determining adjacent texture coefficients for subsample points adjacent to the point x;

(4) means for determining interpolated texture coefficients $A_x$ and $B_x$ for the point x in accordance with the adjacent texture coefficients and with a luma pixel $Y_x$ for the point x; and (5) means for determining $U_x$ as a function of $A_x$ and $Y_x$ and for determining $V_x$ as a function of $B_x$ and $Y_x$.

13. The apparatus of claim 12, wherein:

the means (c)(3) comprises means for determining an adjacent texture coefficient $A_n$ for a point n adjacent to the point x in accordance with the formula $A_n = U_n / Y_n$, determining an adjacent texture coefficient $B_n$ for the point n in accordance with the formula $B_n = V_n / Y_n$, wherein n is a subsample point adjacent to x, determining an adjacent texture coefficient $A_p$ for a point p adjacent to the point x in accordance with the formula $A_p = U_p / Y_p$, and determining an adjacent texture coefficient $B_p$ for the point p in accordance with the formula $B_p = V_p / Y_p$, wherein p is a second subsample point adjacent to x;

the means (c)(4) comprises means for determining $A_x$ in accordance with the formula $A_x = A_n + x(A_p - A_n)/d$ and determining $B_x$ in accordance with the formula $B_x = B_n + x(B_p - B_n)/d$, wherein d is the distance between the points n and p and x is the distance from the point n along a line from the point n to the point p; and the means (c)(5) comprises means for determining $U_x$ in accordance with the formula $U_x = A_x Y_x$ and for determining $V_x$ in accordance with the formula $V_x = B_x Y_x$.

14. The apparatus of claim 13, wherein the apparatus is electrically connected to a bus and the bus is electrically connected to a memory device.

15. The apparatus of claim 8, wherein the plurality of luma pixels are provided at a higher resolution than the plurality of subsampled chroma pixels.

16. The apparatus of claim 8, wherein the apparatus is electrically connected to a bus and the bus is electrically connected to a memory device.

17. A computer system, comprising:

a storage device having stored therein a plurality of subsampled chroma pixels and a plurality of luma pixels of a picture; and a processor coupled to the storage device for upsampling the subsampled chroma pixels of the picture as a function of luma pixels of the plurality of luma pixels to provide at least one upsampled chroma pixel.

18. The computer system of claim 17, wherein the luma pixels of the plurality of luma pixels are spatially related to the subsampled chroma pixels of the plurality of subsampled chroma pixels.

19. The computer system of claim 17, wherein:

the plurality of luma pixels comprises a plurality of Y luma pixels; and the plurality of subsampled chroma pixels comprises a plurality of U subsampled chroma pixels and a plurality of V subsampled chroma pixels.

20. The computer system of claim 17, wherein the subsampled chroma pixels are upsampled by decoding an encoded bitstream to provide the plurality of subsampled chroma pixels and the plurality of luma pixels.

21. The computer system of claim 17, wherein:

the plurality of subsampled chroma pixels are subsampled at a resolution; and the subsampled chroma pixels are upsampled by:

(1) subsampling the plurality of luma pixels at the same resolution as the plurality of subsampled chroma pixels to provide a plurality of subsampled luma pixels;

(2) determining a point x at which to provide upsampled chroma pixels $U_x$ and $V_x$;

(3) determining adjacent texture coefficients for subsample points adjacent to the point x;

(4) determining interpolated texture coefficients $A_x$ and $B_x$ for the point x in accordance with the adjacent texture coefficients and with a luma pixel $Y_x$ for the point x; and (5) determining $U_x$ as a function of $A_x$ and $Y_x$ and determining $V_x$ as a function of $B_x$ and $Y_x$.

22. The computer system of claim 21, wherein:

to determine adjacent texture coefficients, an adjacent texture coefficient $A_n$ is determined for a point n adjacent to the point x in accordance with the formula $A_n = U_n / Y_n$, an adjacent texture coefficient $B_n$ is determined for the point n in accordance with the formula $B_n = V_n / Y_n$, wherein n is a subsample point adjacent to x, an adjacent texture coefficient $A_p$ is determined for a point p adjacent to the point x in accordance with the formula $A_p = U_p / Y_p$, and an adjacent texture coefficient $B_p$ is determined for the point p in accordance with the formula $B_p = V_p / Y_p$, wherein p is a second subsample point adjacent to x;

$A_x$ is determined in accordance with the formula $A_x = A_n + x(A_p - A_n)/d$ and $B_x$ is determined in accordance with the formula $B_x = B_n + x(B_p - B_n)/d$, wherein d is the distance between the points n and p and x is the distance from the point n along a line from the point n to the point p; and $U_x$ is determined in accordance with the formula $U_x = A_x Y_x$ and $V_x$ is determined in accordance with the formula $V_x = B_x Y_x$.

23. The computer system of claim 1, wherein the plurality of luma pixels are provided at a higher resolution than the plurality of subsampled chroma pixels.

* * * * *